United States Patent

Shimizu et al.

[11] Patent Number: 5,178,801
[45] Date of Patent: Jan. 12, 1993

[54] METHOD OF MOLDING A PLASTIC LENS

[75] Inventors: Toshihiko Shimizu; Masataka Soya, both of Suwa, Japan

[73] Assignee: Seiko Epson Corporation, Tokyo, Japan

[21] Appl. No.: 775,787

[22] Filed: Oct. 11, 1991

[30] Foreign Application Priority Data

Oct. 12, 1990 [JP] Japan ................................ 2-273768

[51] Int. Cl.$^5$ ............................................. B29D 11/00
[52] U.S. Cl. ....................................... 264/22; 264/2.5; 264/40.5
[58] Field of Search ........................ 264/2.2, 2.5, 40.5

[56] References Cited

FOREIGN PATENT DOCUMENTS 135030 10/1981 Japan ................................. 264/2.2
261011 11/1986 Japan ................................. 264/2.5

Primary Examiner—James Lowe
Attorney, Agent, or Firm—Ladas & Parry

[57] ABSTRACT

A method of molding a plastic lens, in which: a pair of upper and lower molds are arranged to form a gap, corresponding to the thickness of the lens, therebetween; an adhesive tape is applied around the molds to define a cavity between the molds; and a plastic material is injected into the cavity. Optical axes of the molds are centered at respective positions of the molds. After the centering step, each of the molds is held with the centered optical axis. A height of each mold held is measured referring to a reference height. Displacements of the molds are determined on the basis of the measured heights of the molds and the reference height. The molds held are horizontally moved with the centered optical axes for axial alignment. The molds held are axially moved to form a predetermined mold gap between the molds on the basis of the determined displacements of the molds. Then, the adhesive tape is applied around the molds to define the cavity.

6 Claims, 3 Drawing Sheets

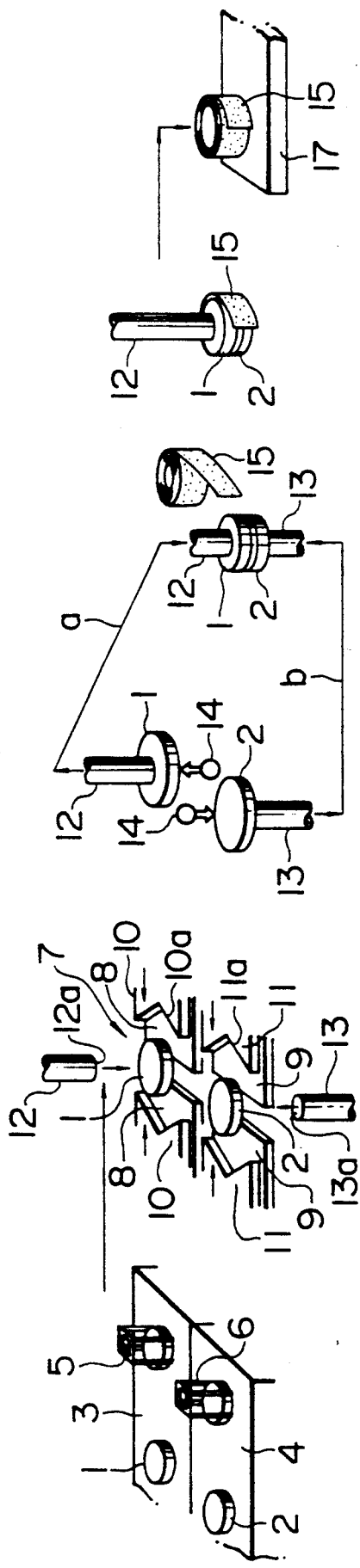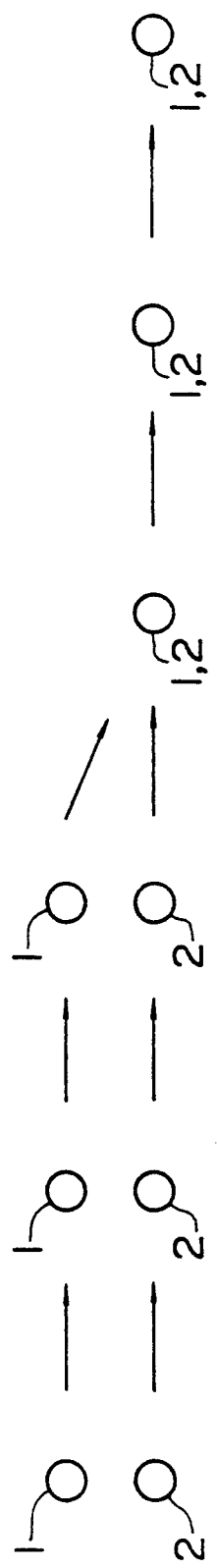

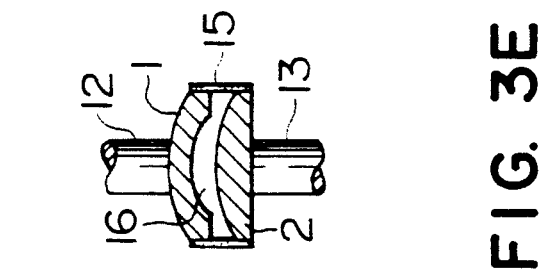
FIG. 3E
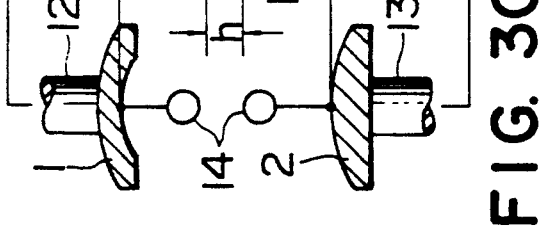
FIG. 3D
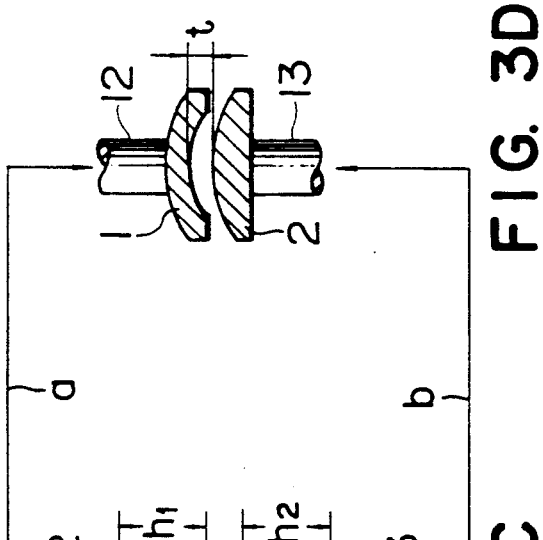
FIG. 3C
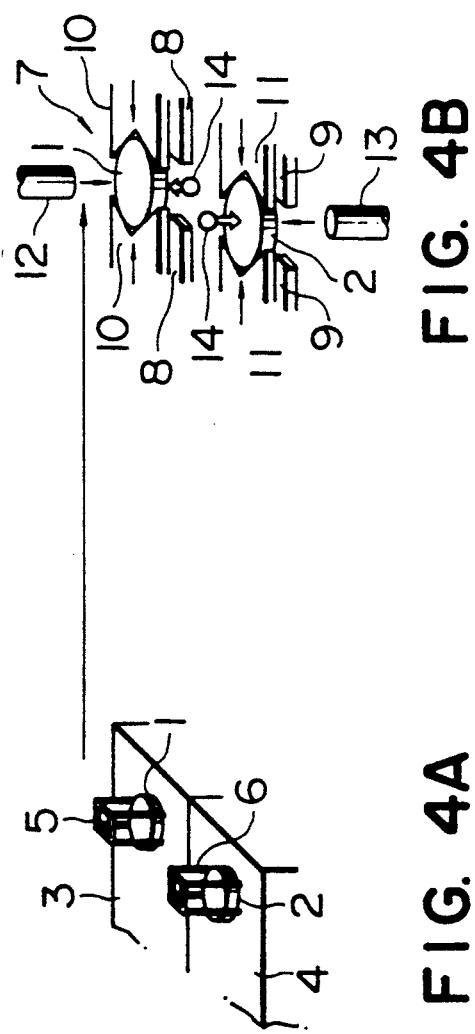
FIG. 4B
FIG. 4A
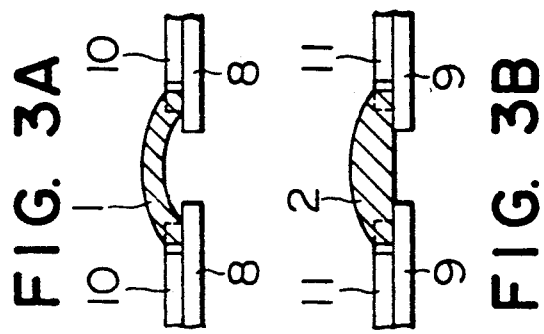
FIG. 3A
FIG. 3B

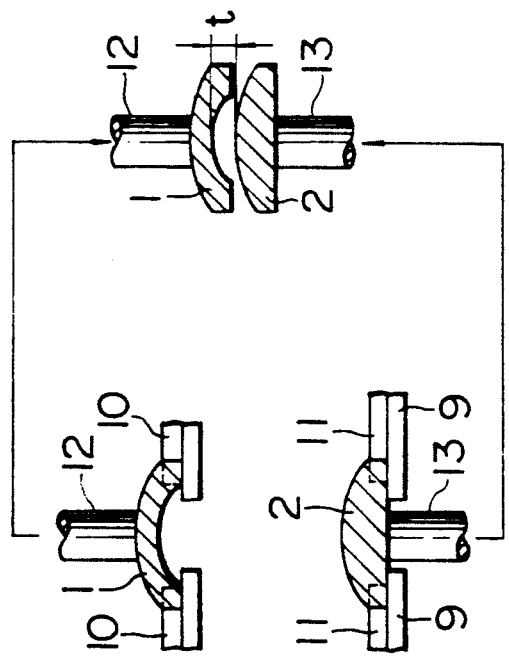
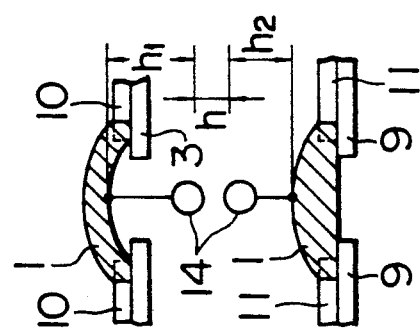
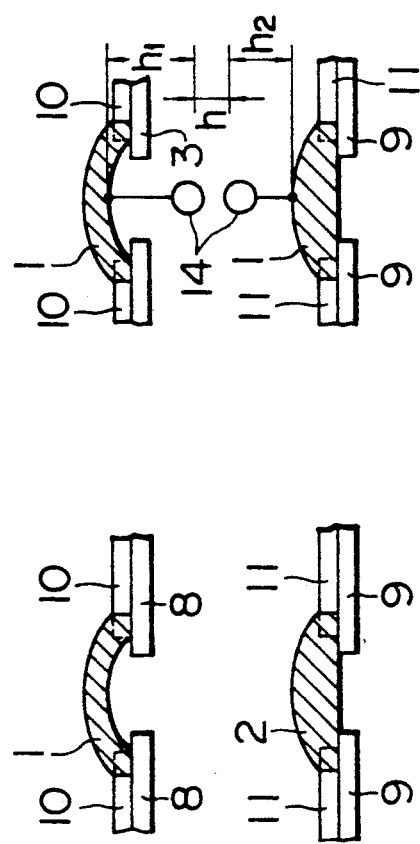
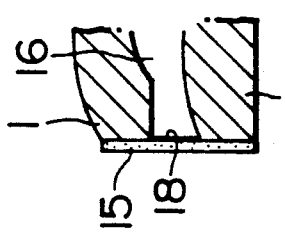

METHOD OF MOLDING A PLASTIC LENS

BACKGROUND OF THE INVENTION

The present invention relates to a method of molding a plastic lens, and particularly but not exclusively relates to a plastic lens molding method which is suitable for molding spectacle lenses.

Molded lenses made of plastics are commonly used for spectacle lenses in place of glass lenses. In molding a plastic lens a pair of molds are usually used. The molds are arranged to form a gap which corresponds to the thickness of the lens, and the gap is sealed at the periphery thereof by a gasket to define a cavity between the molds. A thermosetting resin is injected into the cavity, and is then set by heating. Then, the molded lens is taken out by separating the molds and the gasket.

Such a molding method necessitates many gaskets according to thickness and powers of lens to be molded, and hence considerably raises cost in small-amount and many-kinds production of spectacle lenses.

To overcome such a disadvantage, an attempt has been made, in which a cavity is formed between molds, using an adhesive tape instead of a gasket, and a plastic material is injected into the cavity (Japanese examined patent publication No. 64 (1988)-2483, of which disclosure is incorporated herein by reference). In this earlier attempt, a pair of molds are held by mold jigs; then the molds are positioned to form a gap between them to correspond to the thickness of the lens to be molded; an adhesive tape is applied around the positioned molds to seal the gap to thereby produce a mold assembly which defines a cavity by the molds and the adhesive tape; and finally the mold assembly is taken out of the mold jigs.

In this conventional method, the alignment of the molds and sizing of the gap between the molds depend on the mold jigs. Thus, for different diameters of lenses, corresponding mold jigs must prepared. Particularly in the case of spectacle lenses, there are many kinds of lenses, which require many kinds of mold jigs. Moreover, high accuracy is required not only for mold jigs but also for supporting mechanisms of the mold jigs and other mechanisms of keeping the molds parallel and sizing the gap of the molds. These requirements make it hard to fabricate the mold jigs and the associated mechanisms.

SUMMARY OF THE INVENTION

Accordingly, it is an object of the present invention to provide a method of molding a plastic lens, which method is capable of forming a cavity of the molds with a high accuracy without needs of high degrees of accuracy for each of the molds and related mechanism as compared to the prior art.

In view of this and other objects one aspect of the present is directed to a method of molding a plastic lens, in which: a pair of upper and lower molds are arranged to form a gap, corresponding to the thickness of the lens, therebetween; an adhesive tape is applied around the molds to define a cavity between the molds; and a plastic material is injected into the cavity. The method comprises the steps of: centering optical axes of the molds at respective positions of the molds; after the centering step, holding each of the molds with the centered optical axis; measuring a height of each mold held referring to a reference height; determining displacements of the molds on the basis of the measured heights of the molds and the reference height; horizontally moving the molds held with the centered optical axes for axial alignment; axially moving the molds held to form a predetermined mold gap between the molds on the basis of the determined displacements of the molds; and then, applying the adhesive tape around the molds to define the cavity.

According to the present invention, the centering of the optical axes of the upper and lower molds is achieved at respective positions, and then the molds are held by the mold holders. There is thus no need for various mold holders for lenses as in the prior art, and the mold holders may be used for all the molds. The present invention is suitably applied to small-amount-many-kinds production of lenses such as spectacle lenses.

Furthermore, according to the present invention the molds are held by mold holders after the optical axes of the molds are centered; the mold holders are then moved to be located coaxially, and are axially moved to provide a predetermined central thickness to the cavity formed; and finally an adhesive tape is applied around the molds. The mold assembly is produced by controlling only the stop positions of the mold holders, and a high accuracy is not required with the mold holders as compared to the mold holders according to the prior art.

According to another aspect of the present invention, there is provided a method of molding a plastic lens, comprising: centering optical axes of the molds at respective positions of the molds; after the centering step, measuring a height of each mold referring to a reference height; determining displacements of the molds on the basis of the measured heights of the molds centered and the reference height; after the measuring step, holding each of the molds with the centered optical axis; horizontally moving the molds held with the centered optical axes for axial alignment; axially moving the molds held to form a predetermined mold gap between the molds on the basis of the determined displacements of the molds; and then, applying the adhesive tape around the molds to define the cavity.

BRIEF DESCRIPTION OF THE DRAWINGS

In the drawings:

FIGS. 1A to 1F are illustrations of the steps according to the first aspect of the present invention;

FIGS. 2A to 2F illustrate positions of upper and lower molds in plan views of FIGS. 2A to 2F, respectively;

FIGS. 3A and 3B are axial sections of upper and lower molds of FIGS. 1B and support plate members supporting the corresponding molds, respectively;

FIGS. 3C to 3E are axial sections of upper and lower molds of FIGS. 1C to 1E, respectively;

FIGS. 4A and 4B illustrate steps of the second aspect of the present invention;

FIGS. 5A to 5E are axial sections showing respective steps according to the second aspect of the present invention; and FIG. 6 is an enlarged fragmental axial section of the upper and lower molds around which an adhesive tape is applied.

DETAILED DESCRIPTION OF PREFERRED EMBODIMENTS

Referring to FIGS. 1 to 3, one embodiment of the present invention will be described. Circular upper and lower molds 1 and 2 are, as illustrated in FIG. 1A, transported by belt conveyors 3 and 4 which are arranged parallel to each other, respectively. The upper and lower molds 1 and 2 are convex and concave molds in this embodiment, respectively. The molds 1 and 2 are held by conventional jigs 5 and 6 to the belt conveyors 3 and 4 for transportation to a positioning unit 7.

The positioning unit 7 includes two pairs of mold support plate members 8 and 8; 9 and 9. Each mold support plate member of each pair 8 and 8; 9 and 9 is capable of bearing a corresponding mold 1 or 2 at a lower surface of the front or rear portion of the mold. The mold support plate members 8 and 8; 9 and 9 of each pair are arranged in a horizontal plane with a gap, through which a corresponding mold jig 12, 13 may pass. Aligning members 10 and 10; 11 and 11 of two pairs are slidably placed on upper surfaces of respective mold support plate members 8 and 8; 9 and 9. As illustrated by arrows in FIG. 1B, the aligning members 10 and 10, 11 and 11 are moved at the same speed toward and away from front or rear edges of corresponding molds 1 and 2 by a conventional moving mechanism (not shown). The aligning members 10 and 10; 11 and 11 are each provided in distal edges thereof with a V-shaped contact edge 10a, 11a. The distal edges are formed to face circumferential surfaces of corresponding molds 1 and 2 so that the distal edges may be brought into contact with the circumferential surfaces of the corresponding molds 1 and 2 at two points.

The molds 1 and 2 which have been transported to predetermined positions by the belt conveyors 3 and 4 are located on upper surfaces of mold support plate members 8 and 8; 9 and 9 of corresponding pairs by means of conventional transfer units (not shown) for providing a predetermined degree of parallelization. Then, aligning members 10 and 10; 11 and 11 of each pair are moved toward the corresponding molds 1, 2 by the moving mechanism, so that the molds 1 and 2 are held between the contact edges 10a and 10a; 11a and 11a of aligning members 10 and 10; 11 and 11 of the respective pairs. In this manner centering of the optical axes of the molds is accomplished, and the molds are thus located at predetermined positions.

The mold holders 12 and 13 are moved toward and away from centers of rear surfaces of respective molds 1 and 2 by servo motors through conventional moving mechanisms. The mold holders 12 and 13 are provided at distal ends thereof with suction surfaces 12a and 13a, respectively. The mold holders 12 and 13 are designed to vacuum chuck at suction surfaces 12a and 13a thereof respective molds 1 and 2 not to deteriorate the degree of parallelization. The mold holders 12 and 13 are moved toward rear surfaces of respective molds 1 and 2 for vacuum chucking with the suction surfaces 12a and 13a (FIG. 1B). The suction surfaces 12a and 13a of the mold holders 12 and 13 are preferably arranged to have a degree of parallelization not larger than 4/100 mm.

After holding the molds 1 and 2 with the mold holders 12 and 13 in such a fashion, the height or level of each mold 1, 2 is measured. This is illustrated in FIG. 3C, where actual heights or shifts h1 and h2 of the of the molds 1 and 2 from the reference height or distance h are measured by dial gauges 14 and 14, and then a displacement Δh of the molds 1 and 2 is calculated according to the following equation:

$$\Delta h = h + h1 + h2 - t$$

where t is the distance of the molds 1 and 2 when the molding is performed, or the thickness of the cavity 16 formed by the molds 1 and 2 at the center thereof.

The upper and lower molds 1 and 2 are moved in parallel to each other until this measurement stage of the process as shown in FIGS. 2A to 2C. After this measurement step, the mold holders 12 and 13 are vertically moved away from each other as shown by arrows in FIG. 1C, and are then moved horizontally and vertically toward each other as shown by arrows a and b, so that the mold holders 12 and 13 are coaxially placed. In this state, the mold holders 12 and 13 are stopped. In this event, the misalignment of the mold holders 12 and 13 is usually not larger than 0.1 mm, preferably not larger than 0.05 mm. On the other hand, the mold holders 12 and 13 are moved by the displacement Δh axially toward each other, so that the central thickness t is provided between the molds 1 and 2 (FIGS. 1D and 3D).

After the central thickness t is given, an adhesive tape 15 is applied around the circumferential edges of the molds 1 and 2 to seal the cavity 16, with the central thickness t, formed between them (FIG. 1E). Thus, a mold assembly is produced. It is important to perform the foregoing steps in a dust-free clean environment, which preferably has a cleanliness class of not larger than 100.

Thereafter, the mold assembly is released from the mold holders 12 and 13, and is then transported by a cavity conveyor 17 to the subsequent step, resin material injection step (FIG. 1F).

In the resin material injection step, a resin material is injected into the cavity 16, and is then heated for setting. After the resin material is set, the adhesive tape 15 is removed to taken out the plastic lens.

As the resin material, each of the following materials may be used in the present invention:

Material 1

| | |
|---|---|
| diallylisophthalate | 50 weight parts |
| diethylene glycol bisallyl carbonate | 30 weight parts |
| dibenzil itaconate | 20 weight parts |
| diisopropyl peroxydicarbonate | 3 weight parts |

Material 2

| | |
|---|---|
| diethylene glycol bisallyl carbonate | 100 weight parts |
| diisopropyl peroxydicarbonate | 3 weight parts |

When these materials 1 and 2 are used, they are heated up to 40° to 90° C. for 20 hours for setting.

Material 3

| | |
|---|---|
| 2,2'-bis[3,5-dibromo-4-(2-methacryloyloxyethoxy)phenyl]propane | 50 weight parts |
| styrene | 50 weight parts |

When this material 3 is used, it is heated up to 26 to 90° C. for 22 hours for setting.

In place of these thermosetting resins, conventional ultraviolet ray setting resins may be used.

As the adhesive tape 15, a tape having a hot melt adhesive 18 applied over it may be used. In this case, as shown in FIG. 6 the adhesive 18 is set at part thereof facing to the cavity 16 by heating, so that there is practically no possibility that the adhesive is mixed into the peripheral portion of the molded plastic lens. Moreover, the adhesive may not in effect give any adverse effect on the peripheral shape of the molded lens, and hence an excellent appearance is provided to the molded lens.

As the tape of the adhesive tape 15, use may be made of a polyethylene terephtalate tape with a thickness 50μ, and as the adhesive 18 thereof, a nylon 6 with a thickness 50μ may be used.

FIGS. 4A and 4B illustrate several steps of an alternative method according to another aspect of the present invention, which will be described only about features distinct from the features of the first aspect of the present invention. FIGS. 5A to 5E illustrate steps of the method according to the second aspect to correspond to FIGS. 3A to 3E.

In this embodiment, the heights of the molds 1 and 2 are measured by dial gauges 14 and 14 in the state that the molds 1 and 2 are held by the aligning members 10 and 10; 11 and 11 with the optical axes thereof centered (FIG. 4B). Then, the mold holders 12 and 13 are moved along the optical axes of respective molds 1 and 2 to vacuum chuck the molds 1 and 2. The subsequent steps are performed in the same manner as previously described about the first embodiment: the mold holders 12 and 13 which hold respective molds 1 and 2 are moved vertically away from each other; then the mold holders 12 and 13 are horizontally moved for coaxial alignment while according to the calculated results based on the measurement, the mold holders 12 and 13 are moved by a displacement Δh axially toward each other to provide a central thickness t of the cavity 16.

In this embodiment, the measurement of the height is made in the state in which the molds 1 and 2 are held at the positioning unit 7 with the optical axes centered, whereas according to the first embodiment the measurement is accomplished after the molds 1 and 2 are held by the mold holders 12 and 13. However, in both the embodiments, the positioning of the molds 1 and 2 are made before the molds 1 and 2 are held by the mold holders 12 and 13.

What is claimed is:

1. A method of molding a plastic lens, in which: a pair of upper and lower molds are arranged to form a gap, corresponding to the thickness of the lens, therebetween; an adhesive tape is applied around the molds to define a cavity between the molds; and a plastic material is injected into the cavity, the improvement which comprises the steps of:

centering optical axes of the molds at respective positions of the molds;

after the centering step, holding each of the molds with the centered optical axis;

measuring a height of each mold held referring to a reference height;

determining displacements of the molds on the basis of the measured heights of the molds and the reference height;

horizontally moving the molds held with the centered optical axes for axial alignment;

axially moving the molds held to form a predetermined mold gap between the molds on the basis of the determined displacements of the molds; and then, applying the adhesive tape around the molds to define the cavity.

2. A method of molding a plastic lens as recited in claim 1, wherein the adhesive tape comprises a hot melt adhesive applied.

3. A method of molding a plastic lens as recited in claim 1, before centering step, further comprising the step of paralleling the molds to each other.

4. A method of molding a plastic lens, in which: a pair of upper and lower molds are arranged to form a gap, corresponding to the thickness of the lens, therebetween; an adhesive tape is applied around the molds to define a cavity in the molds; and a plastic material is injected into the cavity, the improvement which comprises the steps of:

centering optical axes of the molds at respective positions of the molds;

after the centering step, measuring a height of each mold referring to a reference height;

determining displacements of the molds on the basis of the measured heights of the molds centered and the reference height;

after the measuring step, holding each of the molds with the centered optical axis;

horizontally moving the molds held with the centered optical axes for axial alignment;

axially moving the molds held to form a predetermined mold gap between the molds on the basis of the determined displacements of the molds; and then, applying the adhesive tape around the molds to define the cavity.

5. A method of molding a plastic lens as recited in claim 4, wherein the adhesive tape comprises a hot melt adhesive applied.

6. A method of molding a plastic lens as recited in claim 4, before the centering step, further comprising the step of paralleling the molds to each other.

* * * * *